US011509699B2

(12) United States Patent
Meybaum et al.

(10) Patent No.: US 11,509,699 B2
(45) Date of Patent: Nov. 22, 2022

(54) AD HOC NETWORK-BASED COLLABORATION USING LOCAL STATE MANAGEMENT AND A CENTRAL COLLABORATION STATE UPDATE SERVICE

(71) Applicant: Anthill, Inc., Wellesley, MA (US)

(72) Inventors: Hardi Meybaum, Cambridge, MA (US); Jaanus J. Juss, Tallinn (EE); Risto Reinpõld, Tallinn (EE); Mikk Olli, Tallinn (EE)

(73) Assignee: Anthill, Inc., Wellesley, MA (US)

( * ) Notice: Subject to any disclaimer, the term of this patent is extended or adjusted under 35 U.S.C. 154(b) by 0 days.

(21) Appl. No.: 17/175,641

(22) Filed: Feb. 13, 2021

(65) Prior Publication Data

US 2021/0203703 A1 Jul. 1, 2021

Related U.S. Application Data

(63) Continuation of application No. 17/030,490, filed on Sep. 24, 2020, now Pat. No. 10,924,522.
(Continued)

(51) Int. Cl.
*H04L 29/06* (2006.01)
*H04L 65/403* (2022.01)
(Continued)

(52) U.S. Cl.
CPC ........... *H04L 65/403* (2013.01); *G06Q 10/10* (2013.01); *H04L 65/4015* (2013.01)

(58) Field of Classification Search
CPC ..... H04L 43/06; H04L 43/087; H04L 65/403; H04L 29/06401; H04L 65/4015;
(Continued)

(56) References Cited

U.S. PATENT DOCUMENTS 9,448,696 B1 9/2016 Kline
2006/0129933 A1* 6/2006 Land .................... G11B 27/034
345/473
(Continued)

OTHER PUBLICATIONS

International Search Report and Written Opinion, PCT/US20/67478, dated Apr. 19, 2021.

*Primary Examiner* — Glenford J Madamba
(74) *Attorney, Agent, or Firm* — David H. Judson

(57) ABSTRACT

According to an exemplary embodiment, multiple users participate in a session to watch source media content (e.g., a movie or a video). Typically, an end user accesses the session via a mobile app executing on the user's mobile device, while the session itself is hosted in a server-based collaboration infrastructure. The source media content comprises at least one branching storyline. At a branch, a storyline in the source media content (typically a series of connected video clips) branches in at least two directions. According to the approach herein, and to facilitate the collaboration, upon reaching the branch, the participants in the session vote to determine the direction the story should then take going forward. Votes cast by the participants then determine which path the story advances. In so doing, the participants—working collaboratively—act as the producers or directors of the movie. In this manner, the system provides an entertaining and collaborative session that is highly interactive and enables the users themselves to determine how the story plays out.

9 Claims, 5 Drawing Sheets

Related U.S. Application Data

(60) Provisional application No. 62/955,648, filed on Dec. 31, 2019.

(51) Int. Cl.
 *G06Q 10/10* (2012.01)
 *H04L 65/401* (2022.01)

(58) Field of Classification Search
 CPC ..... H04L 65/1089; H04L 67/22; G06Q 10/10; H04N 21/8541; H04N 21/4532
 USPC ......................................................... 709/227
 See application file for complete search history.

(56) References Cited

U.S. PATENT DOCUMENTS

| | | | |
|---|---|---|---|
| 2009/0172101 A1* | 7/2009 | Arthursson | G06F 3/0486 709/205 |
| 2010/0325558 A1 | 12/2010 | Edwards et al. | |
| 2012/0005596 A1* | 1/2012 | Carlson | G06F 9/445 715/833 |
| 2014/0059002 A1* | 2/2014 | Lockhart | G06F 16/178 707/622 |
| 2014/0328577 A1 | 11/2014 | Roberts, Jr. et al. | |
| 2016/0373522 A1* | 12/2016 | Carlos | G06Q 10/10 |
| 2017/0285896 A1* | 10/2017 | Chandra | G06F 3/1454 |
| 2018/0131731 A1* | 5/2018 | Jones | H04L 65/1059 |
| 2018/0308036 A1* | 10/2018 | Annambhotla | G06Q 10/101 |
| 2020/0076862 A1* | 3/2020 | Eliason | G06F 3/04897 |
| 2020/0145737 A1* | 5/2020 | Su | H04N 21/8541 |

\* cited by examiner

AD HOC NETWORK-BASED COLLABORATION USING LOCAL STATE MANAGEMENT AND A CENTRAL COLLABORATION STATE UPDATE SERVICE

BACKGROUND

Technical Field

This application relates generally to distributed computing environments that enable online collaboration among multiple users.

Background of the Related Art

Online collaboration environments are well-known. Typically, systems of this type are based on Internet-accessible architectures that provide participating users having computing devices with various capabilities, such as remote control, file transfer, display screen sharing, chat, computer management and the like. Such technologies also are leveraged to facilitate other network-based services, such as video conferencing. Video conferencing is the conduct of a video conference by a set of telecommunications technologies that allow two or more locations to communicate by simultaneous two-way video and audio transmissions. An exemplary Internet-based video conferencing service is enabled as-a-service using a simple web browser or mobile app.

It is also known to provide production environments for collaborative composition and editing of a film or video project by project collaborators, such as video editors, sound editors, effects and graphics artists and producers. In one example, the participants access a shared project workspace hosted on a collaboration server, which includes various workflow tools and applications, to enable collaborative editing of the media project.

BRIEF SUMMARY

A method and system for low latency, ad hoc network-based collaboration, in which participant computing devices are responsible for their own local state management during a collaboration session in which participants interact in the session synchronously or asynchronously, but where state updates for the session as a whole are centrally-managed. Participating computing devices join and leave a collaboration session on an ad hoc, potentially continuous basis, and a particular session is maintained centrally potentially over a relatively long time period (e.g., days, weeks, or longer). By maintaining state locally at the participating local devices (e.g., mobile device apps), and by managing session-based updates centrally, a potentially long-term network-based collaboration is enabled with low latency, high availability, and high scalability.

According to one exemplary embodiment (use case), the network-based collaboration involves multiple users participate in a session to watch source media content (e.g., a movie or a video). Typically, an end user accesses the session via a mobile app executing on the user's mobile device, while the session itself is hosted in a server-based collaboration infrastructure. In this embodiment, the source media content comprises at least one branching storyline. At a branch, a storyline in the source media content (typically a series of connected video clips) branches in at least two directions. According to the approach herein, and to facilitate the collaboration, upon reaching the branch, the participants in the session vote to determine the direction the story should then take going forward. Votes cast by the participants then determine which path the story advances. In so doing, the participants—working collaboratively—act as the producers or directors of the movie. In this manner, the system provides an entertaining and collaborative session that is highly interactive and enables the users themselves to determine how the story plays out.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which.

DETAILED DESCRIPTION

Figure 1:
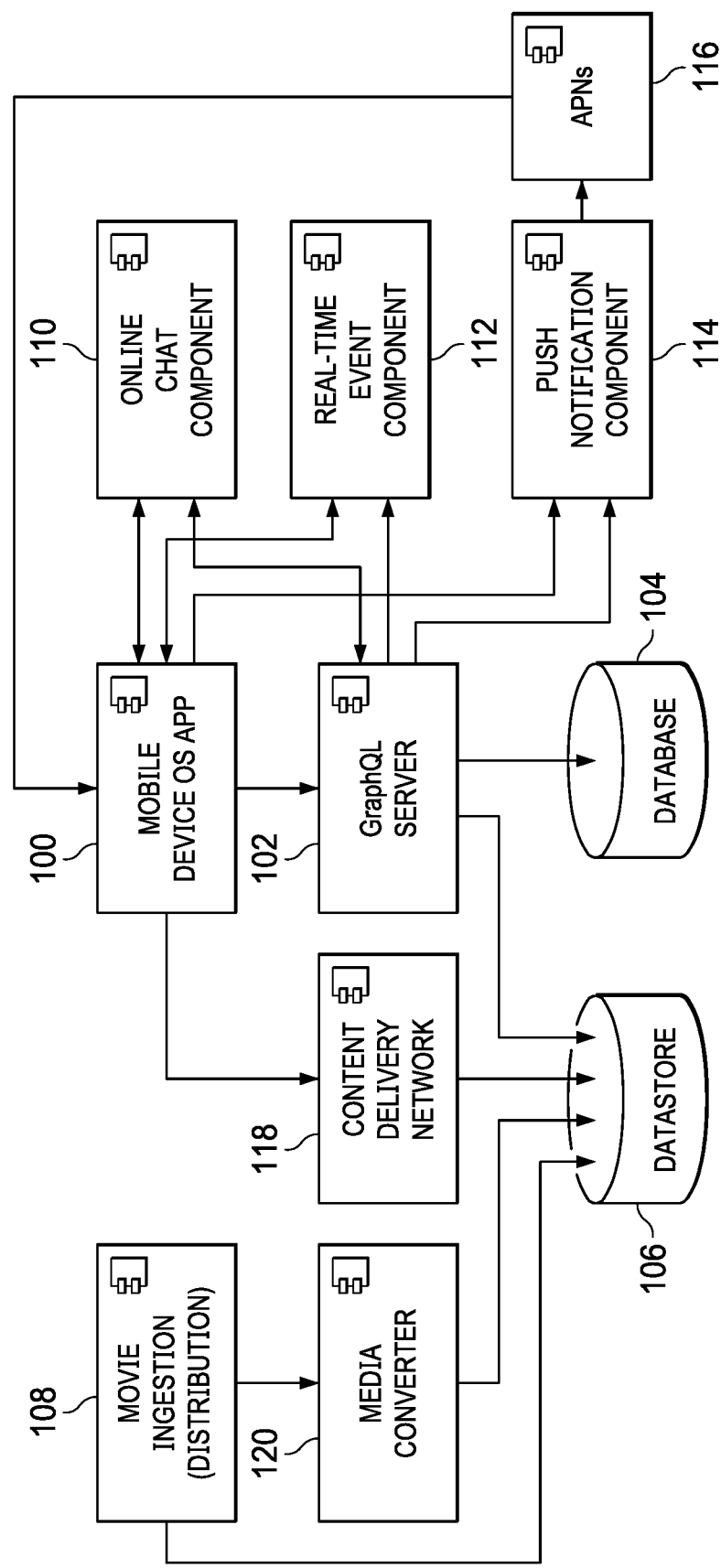
FIG. 1 depicts a network-accessible collaboration system in which the techniques of this disclosure may be implemented.

As noted above, and in an exemplary (but non-limiting) embodiment, the collaboration domain in general is watching and voting on branching storylines. To this end, participating end users typically interact with the service using mobile devices (smartphones and tablets), although this is not a limitation, as an end user may view content on any computing device, such as a laptop, a desktop, a workstation, a Web-connected appliance, and the like. Preferably, an end user accesses the service using a mobile device that comprises a CPU (central processing unit), computer memory, such as RAM, and a drive. The device software includes an operating system (e.g., Apple iOS, Google® Android™, or the like), and generic support applications and utilities. The device may also include a graphics processing unit (GPU). It also includes a touch-sensing device or interface configured to receive input from a user's touch and to send this information to processor. The touch-sensing device typically is a touch screen. The touch-sensing device or interface recognizes touches, as well as the position, motion and magnitude of touches on a touch sensitive surface (gestures). The device typically also comprises a high-resolution camera for capturing images (e.g., QR codes), an accelerometer, a gyroscope, and the like. Any push notification implemented in the service may be provided to the mobile device in any convenient manner, e.g., Apple Push Notification (APN) Service (APN), Google push notification services (for iOS or Android), or the like. A mobile device executes a browser, browser plug-in, or dedicated mobile app that provides a user interface for rendering multiple video clips, e.g., in a side-by-side or top-to-bottom manner, and enabling the user to interact in a collaboration session according to the techniques described herein. As will be described, the multiple video clips rendered on the end user's device represent at least one branched storyline in the source media content that is being viewed collaboratively by the participants. Typically, the source media comprises multiple branched storylines, and the source media may be user-generated content, content published by a third party, or that is otherwise available to be hosted or accessed by the service. Typically, the mobile device app connects to the server environment providing the "service" in a secure manner, e.g., via a TLS-secured connection, and must be authenticated (or otherwise authorized) into a collaboration session.

The collaboration "service" preferably is hosted in a cloud-based environment that comprises a set of services (or components). The service may be implemented using a set of computing resources that are co-located or themselves distributed. Typically, a service is implemented in one or more computing systems. The computing platform (or portions thereof) may be implemented in a dedicated environment, in an on-premises manner, as a cloud-based architecture, or some hybrid. A typical implementation of the compute infrastructure is in a cloud-computing environment. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

Generalizing, the cloud service is a technology platform that may comprise co-located hardware and software resources, or resources that are physically, logically, virtually and/or geographically distinct. Communication networks used to communicate to and from the platform services may be packet-based, non-packet based, and secure or non-secure, or some combination thereof. More generally, the cloud service comprises a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

FIG. 1 depicts a high level view of the main components of an exemplary collaboration system. This system may be implemented in a cloud environment, such as Amazon® AWS. The designation of this commercial system is not intended to be limiting. As noted, end users typically access the system via mobile devices. A representative mobile device runs iOS® app 100 that the end user obtains from the Apple® App Store. As noted, this app provides the interface by which the participating user navigates through branched stories in a collaborative manner. The GraphQL server 102 (provided, e.g., on AWS ECS) provides the main backbone for the end user app 100, and this server supports the GraphQL schema. Graph % is an open-source data query and manipulation language for APIs, and a runtime for fulfilling queries with existing data. The database 104 (provided, e.g., on AWS Aurora) running PostgreSQL provides storage for users, sessions and movie meta-data. Data store 106 (provided, e.g., on AWS S3) hosts rich media including user profile photos, video-on-demand (VOD) content for HTTP Live Streaming (HLS), thumbnails of key frames, and the like. HLS is one well-known technique that provides HTTP Adaptive Streaming (HAS), which uses standard HTTP servers and TCP to deliver the content. The two dominant HAS formats are Apple® HTTP Live Streaming (HLS), and MPEG DASH. A movie ingestion component 108 comprises different functionalities to convert original movie content to a format suitable for HLS. In this embodiment, AWS MediaConvert 120 is used for the format conversion. During an interactive session, end users can communicate with one another in the app, typically via chat. To that end, the system includes an online chat component 110. A real-time event component 112 provides publish/subscribe messaging capabilities, such that the server infrastructure can push events to apps connected to a given session. A push notification component 114 enables push notifications to be sent to the apps from the server environment. Content delivery (HLS streaming) is provided using a content delivery network 118 (e.g., AWS CloudFront).

Figure 2:
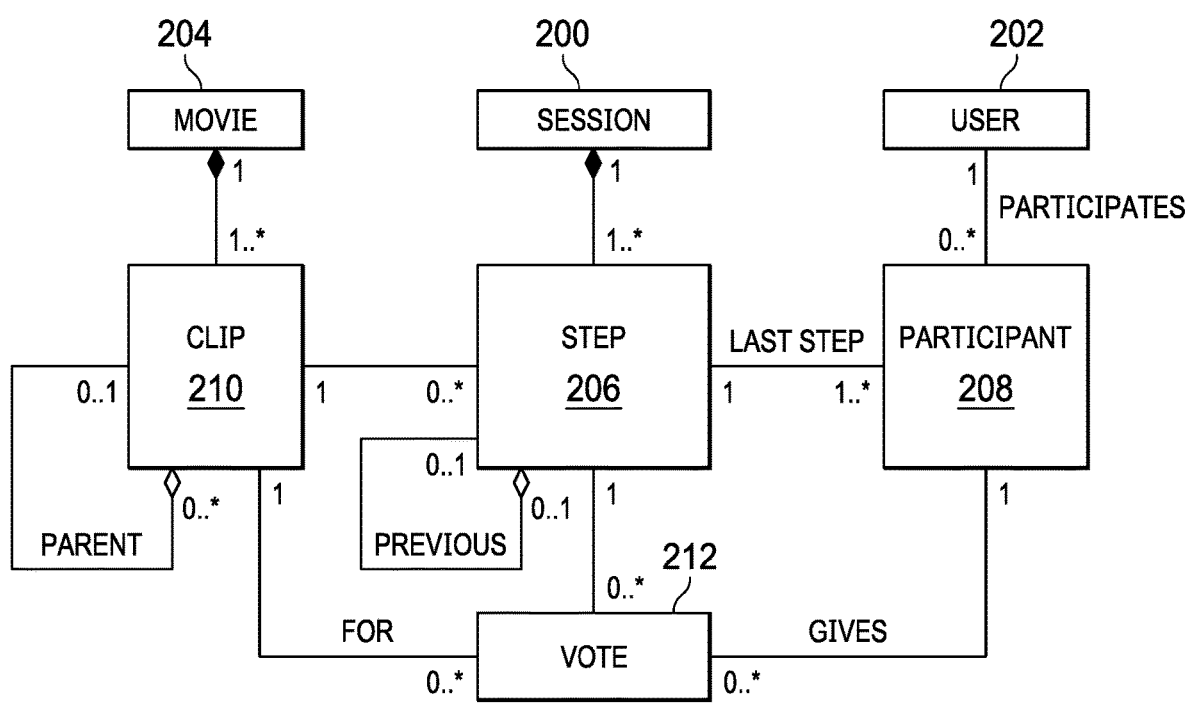
FIG. 2 depicts a model for the collaboration domain of this disclosure, namely, the watching and voting on branching storylines.

FIG. 2 depicts a state model for a representative collaboration domain of this disclosure, namely, the watching and voting on branching storylines. The following provides a glossary for various terms and phrases used in this embodiment.

A "session" 200 is something that users can create to watch a movie together with other participants. In a tree analogy, the session is a single path inside a tree from a root node to one of the leaf nodes.

A "step" 206 is a part of a session, and each step consists of watching a clip followed possibly by a voting where participants can choose which clip to see in a next step. In the tree analogy, the step is a single edge together with the end node inside a single path from a root node to one of the leaf nodes.

A "participant" 208 is a user participating in a session.

A "movie" 204 represents a branching narrative that participants watch in sessions. In the tree analogy, a movie is the whole tree.

A "clip" 210 represents a part of a movie. Because the movie is branching, the exact succession of clips is not predefined and is decided during playback. Each clip can be followed by one of many clips. In the tree analogy, each clip is an edge in the tree.

A vote 212 is cast by a participant in a step to elect the clip for the next step.

Session 200 "events" preferably are sent as push notifications to a session-scoped channel.

Figure 3:
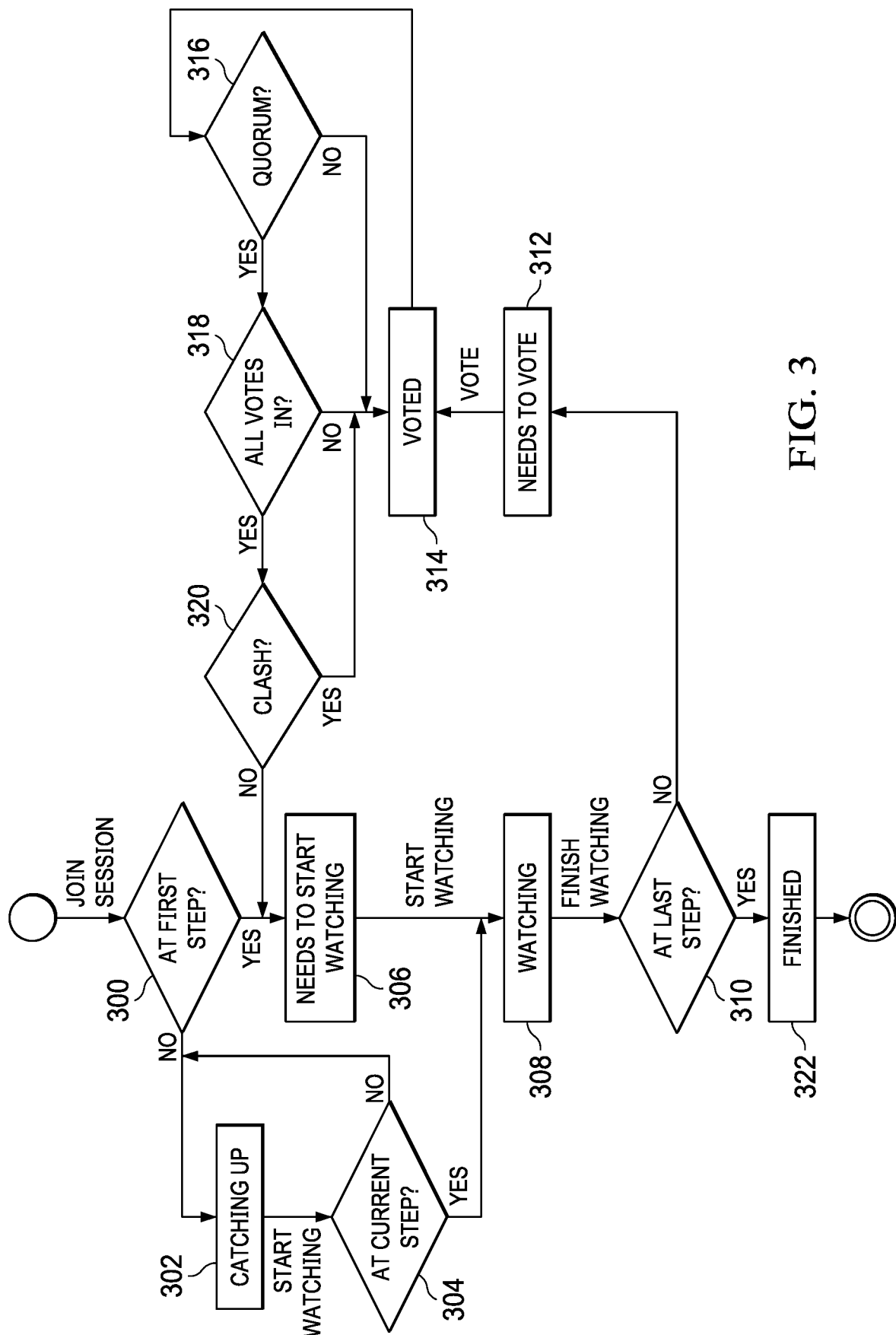
FIG. 3 is a state transition diagram depicting the state transition of a user participating in a session.

FIG. 3 is a state transition diagram depicting the state transition of a user participating in a session. Each user has an associated state transition diagram of this type. The state transitions begin when the user joins the session. A particular collaboration session typically is on-going, in the sense that participants may join and leave the session. Thus, the system keeps track of the end users as the join and/or leave the collaboration session. Typically, each session is distinct from each other session; during the session, a movie with at least one branching storyline (and typically there are many such branches) is rendered, and as participants view the movie they vote on how the story should proceed. End users need not (and often do not) view the movie clips at the same time but, as will be seen, typically the voting must take place with respect to a storyline branch before follow-on clips (however the branch is resolved) can be viewed. Thus, the system preferably enforces time limits on the voting (or, more generally, the participation) so that an entertaining and collaborative session can be carried out for all of the participants, whether presently active in the session or not. The state transition diagram in FIG. 3 assumes that the movie has multiple steps (branched storylines).

At 300, at test is performed to determine whether the user is at the first step (the first branched storyline). If not, the state branches to state 302, which depicts the user catching up (to the current step). At 304, a test is performed to determine whether the user is now at the current step. If not, the flow returns to state 302 and the user continues to catch up. Similarly, if the outcome of the test at 300 indicates that the user is at the first step, the flow moves to state 306 with the user prompted to start watching the movie. State 308 indicates the user watching the current step, and this state is also reached by a positive outcome to the test at step 304. Now, assuming that the user has now completed watching the current step (namely, the one being voted on), a test is performed at step 310 to determine whether the current step is a last step. If not, the flow moves to state 312, which requires the participants to vote on how and where the storyline should proceed. State 312 is sometimes referred to herein as a collaboration state. State 314 reflects that the user has now voted. At 316, a test is performed to determine whether there is a sufficient quorum for the vote. The determination of whether there is a sufficient quorum depends on a number of active participants for the session. The determination of whether a quorum exists may vary depending on the session, the nature of the movie, a system- or user-defined configuration, or otherwise. A test 318 determines whether all of the votes (preferences) necessary for the quorum have been received. If the outcome of test 316 or 318 is negative, the system returns to a wait state, typically waiting on additional votes to be cast (received) from other participants, any of whom may rejoin the session on-the-fly. Preferably, there is a time limit imposed on the voting 314, although this is not a requirement. Even where all votes (for the quorum) are in, a test 320 is performed to determine whether there is a clash in the votes. A clash is an occurrence whereby there are insufficient votes (given the quorum) to determine which direction the storyline should then proceed. If there is a clash, the system returns to the wait state, participants are notified of the clash, and another vote is then taken to determine whether the clash can be resolved.

Based on the voting, the system is thereby controlled to determine the next step (clip) to be rendered to all participants then still participating in the session. This is sometimes referred to herein as a next state. The process then iterates for one or more additional steps. A positive outcome to the test at step 310 indicates that the collaboration has entered a finished state 322, and the process ends.

To facilitate the above-described operation, preferably the end user mobile app loads the initial state from the server by using GraphQL queries, and the received state is stored locally in the app. GraphQL supports reading, writing (mutating), and subscribing to changes to data (real-time updates). The app preferably establishes WebSocket-based connection to the server to receive real-time state updates. Upon user interaction (as described above), the user's mobile app optimistically updates its local state, and asynchronously sends off GraphSQL mutations to the server. The server sends state update events to all other (active) apps involved in the session. Each app either updates its local state purely on the received event or, as needed, makes additional GraphQL queries to synchronize the local state.

Figure 4:
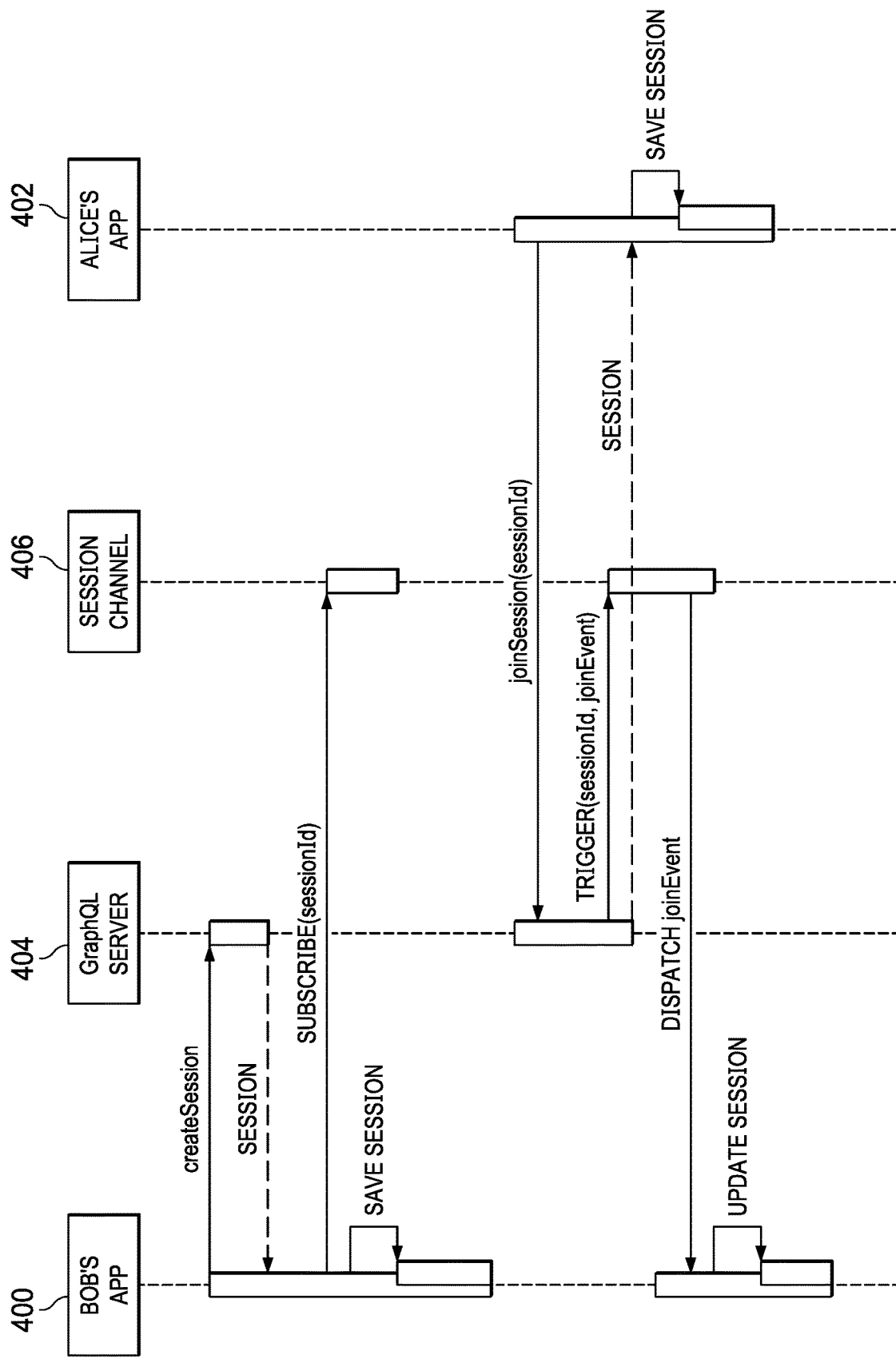
FIG. 4 depicts a workflow by which a user joins a session.

FIG. 4 depicts users joining a session. In this example, user Bob executes app 400, while user Alice executes app 402. The operation of the GraphQL server 404 is depicted with respect to the established session channel 406. Viewing the operations from top to bottom, user Bob's app 400 creates the session with the GraphQL server 404. The session is established and app 400 subscribes to the session via the session channel 406. The app 400 then saves the session information state locally. Thereafter, user Alice attempts to join the session by interacting with the GraphQL server 404 as shown. The server 404 interacts with the session channel to join Alice to the session, and to provide an indication to the Bob that Alice has now joined. Bob's app 400 responds by updating the local session step (to reflect Alice's joinder), and Alice's app 402 saves the session locally on her device. Additional participants join a session in a similar manner, and the number of users that may be participate in a session is implementation-dependent. Preferably, the system is configured to operate continuously (24/7/365), with individual components provisioned and de-provisioned automatically according to current load (number of concurrent sessions, number of participants/session, etc.). By maintaining state locally at participating apps, low latency is achieved.

As previously noted, the commercial system components described above are not intended to be limiting.

The mobile app provides a display interface through which a user interacts with the back-end infrastructure. In one embodiment, the app provides a user registration screen by which the user enters his or her identifying data (e.g., name, user identifier, date of birth, interests, etc.). The user is then invited to view a movie, e.g., from a list of available content, identified on a content screen. Once the user selects a movie to view, preferably the user app also provides a "share" function by which the user can then invite his or her friends, e.g., from an existing social group (e.g. Facebook, Instagram, etc.). A session (sometimes referred to as a "hack" party) for a movie (a "hackable" film) is then initiated in the manner previously described. Depending on where the user is in the session (e.g., seeking to catch up with others), the app exposing display controls by which the user can scroll (fast forward, reverse, etc.) to various portions of the film. Preferably, the display interface provides a visual representation of where the user is within the context of the overall film's timeline, and each storyline branch also may be identified in this representation. More generally, one or more visual guides may be provided to enable the user to determine where he or she is located in the movie. As the user participates in the hack, he or she may accumulate points, and the system may expose associated contests or games that otherwise gamify the user's (or the social group's) experience. When a step (a hack point) in the movie is reached, the participants in the hack party vote as to how the plot should then advance. To this end, typically the system stores in advance the different clips corresponding to the different storyline variants. In a preferred (but non-limiting) embodiment, the decision regarding which way to move along the plot must be unanimous based on the users then-participating in the hack party.

Figure 5:
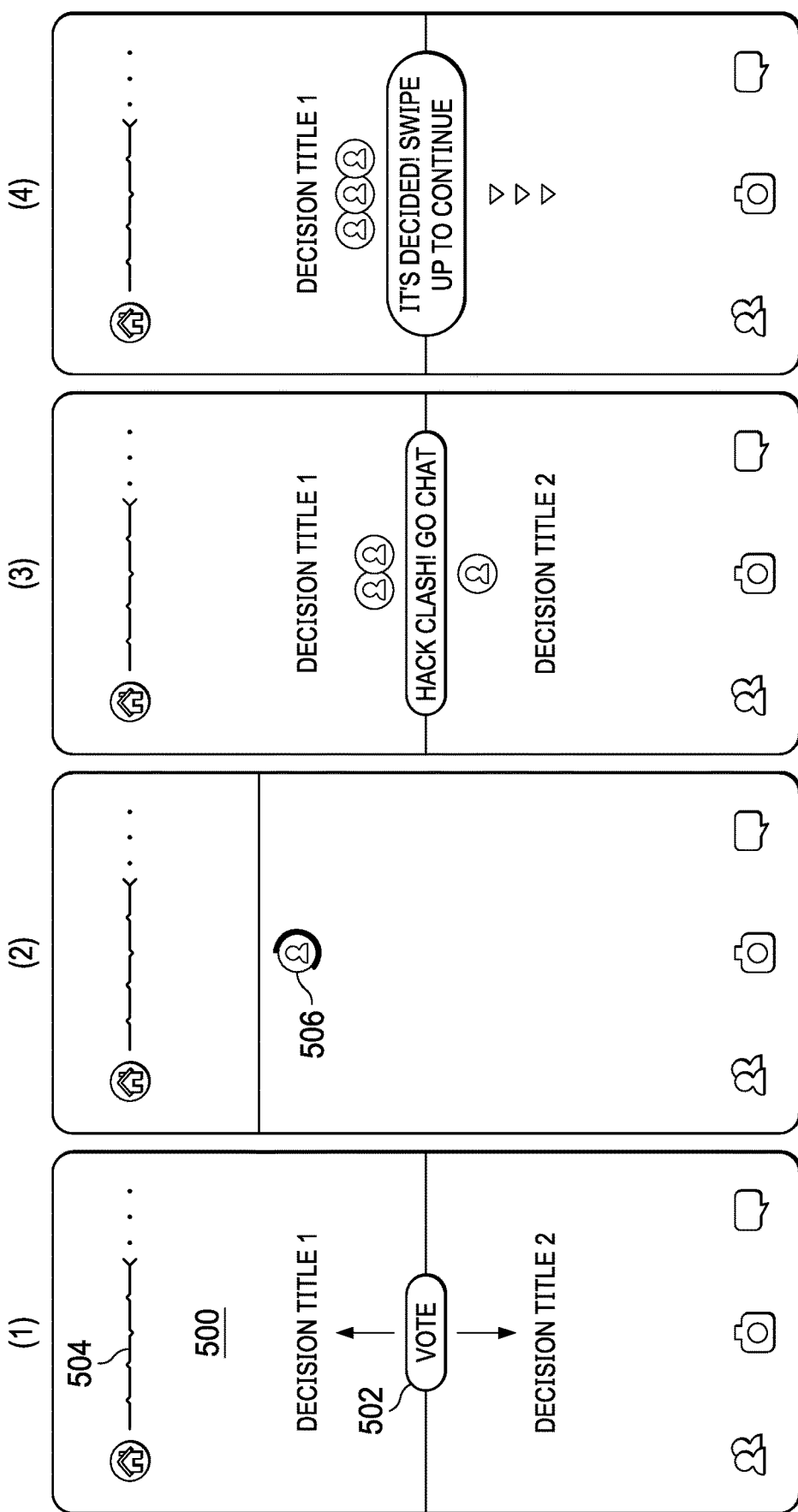
FIG. 5 depicts a representative mobile device user app display interface as the user "votes" for a particular branch to continue and then collaborates with other users to resolve a conflict.

FIG. 5 depicts a representative display interface 500 for a first user's mobile app when a step is reached in the movie and a vote needs to be taken to determine if and how the movie's branched storyline should then proceed. In this example scenario, which is not intended to be limiting, there are several active participants, although the identities of the other participants are not (at this point in the decision-making) exposed to the user. The first screen (1) shows the user two options (e.g., Decision Title 1, and Decision Title 2), and a "Vote" display element 502. The visual representation of where the user is within the context of the overall film's timeline is shown, preferably as a sparkline 504 at the top of the display. The user has to swipe to vote. Using a "swipe-to-vote" gesture, the user selects which path he or she desires the movie to proceed along. The swipe-to-vote gesture (in this example preferably either up or down) is implemented on the mobile device touch screen by the mobile app (e.g., using iOS UISwipeGestureRecognizer class to detect swipe gestures). The second screen (2) shows that the user (in this example) has swiped up to vote for Decision Title 2). While the user drags the screen, an avatar 506 (or some other a user identifier such as the user's photo) appears together with a circular progress bar around it showing how far he or she has swiped (or still needs to swipe) to complete his or her vote. When the progress bar reaches full circle, the user's vote is locked and the user can release his or her finger from the display surface. After the user has voted, the other votes are revealed, as depicted in the third screen (3). In this example scenario, however, the other active users have selected Decision Title 1. This is a conflict state, because the user has voted down while the other participants (shown by their avatars) have voted up. In the preferred embodiment, the movie cannot continue until someone in the group changes their vote. As depicted in (3), the user's screen suggests that the users enter a chat session to attempt to resolve their differences. Screen (4) represents the result of that chat session (in this example scenario), with the previously-dissenting first user changing his or her vote (swiping again but this time voting up) such that there is now a unanimous vote. Because everyone in the group voted in the same direction, all participants can continue watching the file. To this end, a final swipe is needed to start playing the next scene.

While the swipe gesture preferably is vertical (up or down), a horizontal (left or right) presentation and gesture selection may be used in the alternative.

According to another aspect, preferably the mobile app provides for the capability of public sessions (e.g., watch parties). To this end, a given user may notify his or her friends (or other direct or indirect invitees) that the user is initiating a session (e.g., a watch party) with respect to the content of interest. Appropriate invite messages or other social media-based invitations to the session are then provided to the one or more other users, who may then use their apps to join the session (or obtain an app for that purpose if necessary). As a result, the visitors/participants to the session become connected with one another.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A computer-readable medium having instructions stored thereon to perform the ingest, index, search and retrieval functions is non-transitory.

A given implementation of the disclosed subject matter is software written in a given programming language that runs on a server on commodity hardware platform running an operating system, such as Linux. One or more of the system components may be implemented as well as a virtual machine or appliance, or in any other tangible manner.

While given components of the system have been described separately, one of ordinary skill will appreciate that some of the functions may be combined or shared in given instructions, program sequences, code portions, and the like.

The functionality may be implemented with other application layer protocols besides HTTP/HTTPS, or any other protocol having similar operating characteristics.

There is no limitation on the type of computing entity that may implement the client-side or server-side of any communication. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

The notion of a branched storyline as used herein may be generalized as a temporal event within a sequence of a source media (a set of clips, video frames, or the like) having a timeline, and having an associated action. The temporal event is a decision point in the timeline that may then branch in at least one or several directions based on the collaborative user interactivity.

The above-described collaboration method, system and technologies may be used to support a wide variety of use cases. Thus, the nature of the content is not a limitation of the disclosure. Other representative use cases include, without limitation, education and distance learning, video collaboration (e.g., music videos), and many others.

The techniques herein provide for improvements to technology or technical field, as well as improvements to various technologies, all as described.

What we claim is as follows:

1. A method operative in a centralized computing infrastructure, comprising:

responsive to receipt of a request, establishing an ad hoc collaboration session to which participating computing devices subscribe, synchronously or asynchronously with respect to one another, over an unrestricted time period, each of the participating computing devices have a gesture-responsive display interface;

as a participating computing device subscribes to the collaboration session or provides information about a change to its local state, providing a real-time state update to one or more other computing devices that are participating in the session such that the participating computing devices continually maintain their respective local state; and executing a collaborative interaction among the participating computing devices;

wherein the collaborative interaction comprises:

responsive to a determination based on the real-time state updates that a decision point has been reached, transitioning the collaboration session to a collaboration state;

during the collaboration state, and responsive to receipt of data from a given subset of the participating computing devices, determining a next state, wherein the data from at least one participating computing device includes a result of a swipe gesture on the gesture-response display interface indicating a preference for the next state; and responsive to determining the next state, providing each of the participating computing devices an update identifying the next state.

2. The method as described in claim 1 wherein the next state is associated with delivery to each of the participating computing devices in the collaboration session of a portion of a source media file as determined by the given subset of the participating computing devices.

3. The method as described in claim 1 wherein at least one participating computing device joins the ad hoc collaboration session after the ad hoc collaboration session is established.

4. The method as described in claim 1 further including:
determining whether the given subset of participating computing devices is present; and
when the given subset is not present, delaying transitioning to the collaboration state until the given subset is present.

5. The method as described in claim 1 wherein the result of a swipe gesture is a vote, wherein the data received the given subset of the participating computing devices constitutes a set of votes, and wherein determining the next state further includes resolving any conflict among votes cast by the subset of participating computing devices.

6. The method as described in claim 1 further including:
determining that a last state has been reached; and
upon a determination that the last state has been reached, terminating the collaboration session.

7. The method as described in claim 1 wherein participating computing devices receive and view a source media file at different times.

8. The method as described in claim 1 wherein real-time state updates are provided according to a graph-based schema.

9. The method as described in claim 1 further including inviting end users to participant in the ad hoc collaboration session.

* * * * *